United States Patent Office 3,806,424
Patented Apr. 23, 1974

3,806,424
MICRO-ORGANISM SENSITIVITY PACK
George Newbolt Rolinson, Newdigate, England, assignor to Beecham Group Limited, Brentford, Middlesex, England
Filed Apr. 26, 1972, Ser. No. 247,610
Claims priority, application Great Britain, Apr. 26, 1971, 11,390/71
Int. Cl. C12k 1/10
U.S. Cl. 195—127   5 Claims

ABSTRACT OF THE DISCLOSURE

A test pack for testing the sensitivity of a micro-organism to an antibiotic is prepared, which test pack comprises a base member which has on a plane or surface thereof at least one shallow well which contains a gel medium and an absorbent material at least part of which is impregnated with an antibiotic, the absorbent material being of dimensions such that on being placed in contact with the gel medium in the well there is antibiotic impregnated absorbent material in contact with substantially the whole surface area of the gel medium.

---

Figure 1:
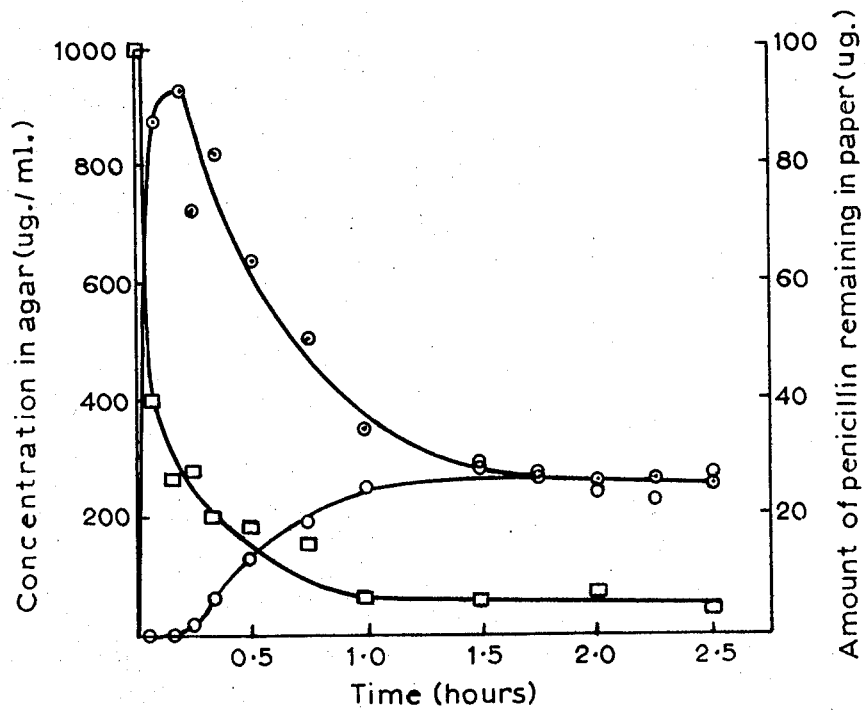

This invention relates to a novel test pack for use in testing for the sensitivity of micro-organisms to antibiotics.

Antibiotic sensitivity testing of micro-organisms, especially of bacteria, is a routine procedure in clinical laboratories. The methods used for such testing may differ in different laboratories but in principle the tests all fall into one or other of two groups. One group comprises those tests which involve serial dilution of the drug and the other group includes those tests which are described as diffusion tests. In the following description of the prior art we refer in particular to the problems in the testing of bacteria.

The serial dilution method of sensitivity testing involves the preparation of a series of concentrations of an antibiotic, either in a liquid or a solid medium which will support the growth of the bacterium to be tested. Liquid media are conveniently dispensed in test tubes while solid media are usually poured into petri dishes. It is common practice to prepare the range of antibiotic concentrations as a series of two-fold dilutions. In this way the concentration of antibiotic in each tube or petri dish differs from that in the adjacent member of the series by a factor of 2. In order to carry out the test each tube or petri dish is inoculated with the bacteria in question and after a period of incubation the bacterial growth or absence of growth at each antibiotic concentration is observed. In this way the minimum inhibitory concentration of antibiotic is determined to the nearest dilution used in the series. This type of test is probably the most satisfactory method of determining the antibiotic sensitivity of a bacteria. The method is, however, time consuming and most clinical laboratories feel unable to use this as a routine procedure. Most laboratories use a diffusion method for sensitivity testing and of these the paper disc method is the most widely used.

In the paper disc sensitivity test a layer of suitable agar medium is first prepared in a petri dish and the surface is then inoculated with the bacteria to be tested. A small paper disc impregnated with antibiotic is then placed on the surface of the agar and the petri dish is then incubated to allow bacterial growth to take place. Several paper discs, each containing a different antibiotic may conveniently be placed on the same petri dish. During the period of incubation the antibiotic diffuses from the paper into the agar and sets up a concentration gradient. Provided the amount of antibiotic on the disc is suitable the concentration gradient will be such that at some point from the disc the antibiotic concentration in the agar will correspond to the sensitivity of the bacteria under test. After the period of incubation a zone of inhibition will thus occur; within this zone the concentration of antibiotic will be at an inhibitory level while outside this zone the concentration will be below an inhibitory level. As a result of the antibiotic concentration gradient which is set up in this test, the size of the zone of inhibition produced can be used as an index of the sensitivity of the bacteria under test; a large zone will indicate that the bacteria is sensitive to low concentrations of antibiotic while a small zone will indicate that the bacteria is only inhibited by higher concentrations of drug. However, the sensitivity of the bacterium is not the only factor which determines the size of inhibition zone produced in this test. The amount of antibiotic present on the disc itself will clearly influence zone size. Other factors influence zone size including the thickness of agar and the relative rates at which antibiotic diffuses and bacterial growth takes place. If the number of bacteria used to inoculate the plate is small or if the rate at which bacterial growth proceeds is slow, a correspondingly greater period of time will elapse during which outward diffusion of antibiotic can take place. Inhibitory levels of antibiotic may then be reached at points further away from the disc than would otherwise be the case and relatively large zones of inhibition will result. Conversely, factors which favor rapid growth of the test bacteria will result in the formation of relatively small zones of inhibition because under such circumstances less time will have elapsed for outward diffusion of the drug.

In carrying out the disc sensitivity test the importance of standardization of procedure has been stressed by many authors. Some workers have recommended standardization procedures both for the carrying out of the test and for interpretation of the results.

According to these recommendations a bacteria is considered sensitive to a particular antibiotic provided the diameter of the zone of inhibition exceeds a certain size. Zone diameters are also defined which indicate either intermediate sensitivity or resistance. Despite these and other attempts to standardize the disc sensitivity test the position remains generally unsatisfactory. It is not clear whether this is due to the inadequacy of the standardization or the failure of many laboratories to carry out such standardization. In any event the position is unsatisfactory. In 1960 a group of technicians in Birmingham carried out a survey of antibiotic sensitivity testing in which six bacterial cultures were sent to a number of hospital laboratories for testing by the laboratory's routine method. The results showed a marked lack of agreement between one laboratory and another. For example in the case of one culture 15 laboratories reported the culture sensitive to streptomycin while 13 reported it resistant. Similarly, in the case of another culture 11 laboratories reported it to be sensitive to pencillin while 19 laboratories reported it to be resistant. In 1965 a report was published of the results of an antibiotic sensitivity test trial organized by the Bacteriology Committee of the Association of Clinical Pathologists in which 154 laboratories took part. Four bacterial cultures were sent to each laboratory for testing by the laboratory's routine method. The report concludes that "the results justify complaints from clinicians that laboratory tests, as done at present, are unreliable."

More recently, a report has been published of a survey of antibiotic sensitivity testing in which two bacterial cultures were sent to each of 73 laboratories in Australia for routine antibiotic testing. The report of the results shows that with regard to penicillin G for example, with one of the cultures, 26 laboratories reported it to be resistant and 34 reported it sensitive while 9 considered it intermediate in sensitivity. The other organism was reported to be resistant by 19 laboratories but sensitive by 51 and 3 laboratories considered it intermediate.

The most satisfactory method of sensitivity testing would probably be the serial dilution test were it not for the fact that it is regarded as being too time consuming and in this connection the object of the standardization procedures is to enable inhibition zone size to relate directly to the minimum inhibitory concentration of the bacterium under test. It is desirable therefore to have a test which has the simplicity of the paper disc method but which gives the type of result obtained in the serial dilution test, namely, inhibition or lack of inhibition of bacterial growth at precise concentrations of antibiotic.

It is an object of the present invention to provide a novel test pack for use in testing for the sensitivity of a micro-organism to an antibiotic and with which uniform results may be obtained.

It is a further object of the present invention to provide a test pack for use with antibiotics that are not stable in gel media on storage, especially penicillins.

Accordingly the present invention provides a test pack for testing for the sensitivity of a micro-organism, to an antibiotic which test pack comprises a base member having on a planar surface thereof at least one shallow well as herein defined containing a gel medium, and an absorbent material at least part of which is impregnated with an antibiotic and of dimensions such that on being placed in contact with the gel medium in the well, there is antibiotic impregnated absorbent material in contact with substantially the whole surface area of the gel medium.

Preferably the test pack comprises a base member having a plurality of shallow wells, and an absorbent material impregnated with one or more antibiotics in discrete areas each corresponding to the area of gel medium in each well. Preferably the gel medium consists of agar containing nutrients. Most preferably the micro-organism being tested is a bacteria. By a "shallow well" we mean a well less than 1 cm. deep, and preferably less than 5 mm. deep, a preferred layer being 2-3 mm. deep.

With a test pack in which the base member has a plurality of wells, the areas of antibiotic on the absorbent material may contain different antibiotics each at one or more concentrations. When the absorbent material is applied to the gel medium, the antibiotic diffuses into the gel and during a reasonable period of time to give a uniform and known concentration throughout the gel. Suitably a period of 1-3 hours allows a uniform concentration to be attained depending on the antibiotic used. The concentrations of antibiotic in the gel media depends on the criteria required in a test, and standardization of the concentrations used is easily effected with the device according to the present invention. After diffusion of the antibiotic into the gel medium, the absorbent material is removed and the gel medium is inoculated with the micro-organism.

The sensitivity in terms of inhibition of growth at certain antibiotic concentrations may be determined directly by the method of the present invention, instead of indirectly by means of a zone diameter, for example in the usual paper disc method.

Tests were conducted with agar medium to determine the rate of diffusion of penicillin G through a 3 mm. layer. Blocks of agar 1 cm. x 1 cm. x 3 mm. were prepared and 1 cm. squares of filter paper containing 100 μg. penicillin G were applied to the upper surface of the blocks. After intervals of time the concentration of penicillin in the upper and lower surfaces of agar was assayed. This was carried out by removing the antibiotic paper and applying a 1 cm. square of filter paper to the upper and lower surfaces of the blocks.

A fixed volume of liquid is thus taken up by the paper from the agar surfaces and the concentration can be assayed against standards prepared from agar containing known concentrations of antibiotic. The antibiotic remaining in the original paper was also assayed against appropriate standards.

The results are shown in the following FIG. 1, of the accompanying drawings which confirm that uniform distribution of the antibiotic occurs rapidly.

The results of further tests are illustrated in Table 1. In the figure ⊙—⊙ and ○—○ refer to the concentrations penicillin in the upper and lower surfaces of the agar respectively, and □—□ to the penicillin remaining in the filter paper.

TABLE 1

| Antibiotic | Quantity (μg.) | Diffusion time (minutes)[1] |
|---|---|---|
| Penicillin G | 1.0 | 110 |
|  | 10 | 110 |
|  | 100 | 110 |
| Ampicillin | 100 | 120 |
| Tetracycline | 10 | 230 |
|  | 100 | 230 |
| Streptomycin | 100 | 160 |
| Erythromycin | 100 | 220 |
| Gentamicin | 100 | 190 |

[1] Time taken for concentration of antibiotic at the lower surface of agar to reach 95% of the concentration at the upper surface in a layer of agar 3 mm. thick.

NOTE.—The quantities of antibiotic applied have been chosen for convenience of assay and are not those which would necessarily be used in practice. Diffusion time appears independent of the quantity of antibiotic used.

Comparative tests were carried out between the method of the present invention and the conventional serial dilution method. The results are shown in Table 2.

TABLE 2

Comparison of the results of the diffusion test with the minimum inhibitory concentration as determined by conventional serial dilution in agar. Undiluted overnight broth cultures were used and the same inoculum was used to inoculate both tests. In the diffusion test the antibiotic papers were removed from the agar surface after a period of 3 hr. diffusion. In the diffusion test the plates were inoculated with a swab and the plates for M.I.C. determination were inoculated with a drop using an automatic device delivering approximately 0.003 ml.

|  | Final concentration of antibiotic in the diffusion test (μg./ml.) and growth of test organism | | | M.I.C. by serial dilution in agar (μg./ml.) |
|---|---|---|---|---|
| Benzylpenicillin | 0.2 | 0.1 | 0.05 |  |
| Staph. aureus Oxford | − | − | − | 0.02 |
| Staph. aureus T113 | − | ± | ± | 0.25 |
| Staph. aureus T137 | − | ± | + | 0.125 |
| Ampicillin | 0.5 | 0.25 | 0.12 |  |
| Staph. aureus Oxford | − | − | − | 0.05 |
| Staph. aureus T113 | − | − | − | 0.25 |
| Staph. aureus T137 | − | + | + | 0.25 |
| Ampicillin | 10 | 5 | 2.5 |  |
| E. coli 10418 | − | − | ± | 2.5 |
| E. coli 37 | + | + | + | 25 |
| E. coli JT49 | − | − | + | 5 |
| E. coli JT50 | − | ± | + | 5 |
| E. coli JT52 | − | − | + | 5 |
| P. mirabilis WM77 | − | − | + | 5 |
| Salm. typhimurium CT | − | − | + | 2.5 |
| Shigella sonnei Il | − | − | + | 2.5 |

TABLE 2—Continued

| | Final concentration of antibiotic in the diffusion test (μg./ml.) and growth of test organism | | | M.I.C. by serial dilution in agar (μg./ml.) |
|---|---|---|---|---|
| Carbenicillin | 100 | 50 | 25 | |
| Ps. aeruginosa A | — | — | + | 50 |
| Ps. aeruginosa R59 | — | — | ± | 12.5 |
| Ps. aeruginosa R1 | — | — | + | 25 |
| Ps. aeruginosa R62 | — | — | + | 25 |
| Ps. aeruginosa R139 | — | — | + | 50 |
| Carbenicillin | 10 | 5 | 2.5 | |
| E. Coni 10418 | — | — | + | 1.25 |
| E. coli 100 | — | — | — | 1.25 |
| E. coli 101 | — | ± | + | 5.0 |
| Enterobacter cloacae 10005 | — | — | + | 5.0 |
| P. mirabilis H | — | ± | + | 5.0 |
| P. rettgeri C | — | — | ± | 5.0 |
| P. vulgaris B | — | — | + | 1.25 |
| P. morganii G | — | — | + | 1.25 |
| Tetracycline | 5 | 2.5 | 1.25 | |
| E. coli 10418 | — | + | + | 5.0 |
| E. coli 37 | ± | + | + | 5.0 |
| E. coli JT49 | — | ± | + | 5.0 |
| E. coli JT50 | — | + | + | 5.0 |
| E. coli JT52 | + | + | + | 5.0 |
| P. vulgaris A | — | — | — | 2.5 |
| P. morganii A | — | ± | + | 2.5 |
| Shigella sonnei II | — | + | + | 10 |
| Erythromycin | 0.5 | 0.25 | 0.12 | |
| Staph. aureus Oxford | — | — | — | 0.12 |
| Staph. aureus T112 | — | — | — | 0.12 |
| Staph. aureus T137 | — | — | + | 0.5 |
| Staph. aureus Smith | — | — | + | 0.25 |

NOTE.—+= growth; ±=partial inhibition of growth;—=no growth.

Figure 2:
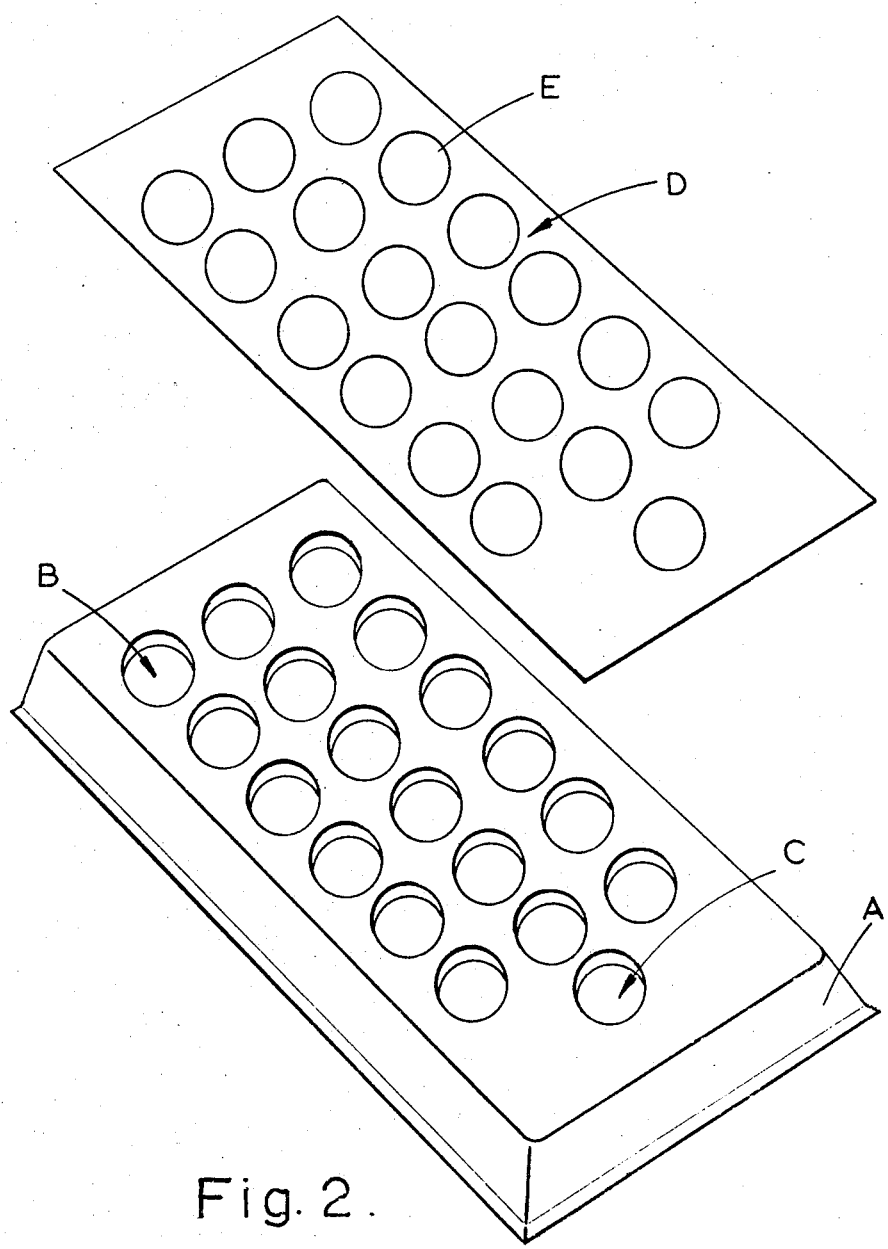

By way of example specific embodiments of the invention will now be described with reference to the accompanying FIG. 2, in which the base member A is a tray made of thin transparent plastic. It has six rows each of three wells B, each well being circular and 3 mm. deep and 18 mm. in diameter. There is also a separate well for a control test, i.e. no antibiotic is in the gel medium. Each well is filled with agar flush with the surface of the tray.

The test pack is completed by a sheet of filter paper D impregnated in zones E with six antibiotics each at three concentrations. The zones E are arranged on the filter paper D such that when the filter paper is applied to the base member each area of agar will have a corresponding area of antibiotic impregnated filter paper in contact with it.

Figure 3:
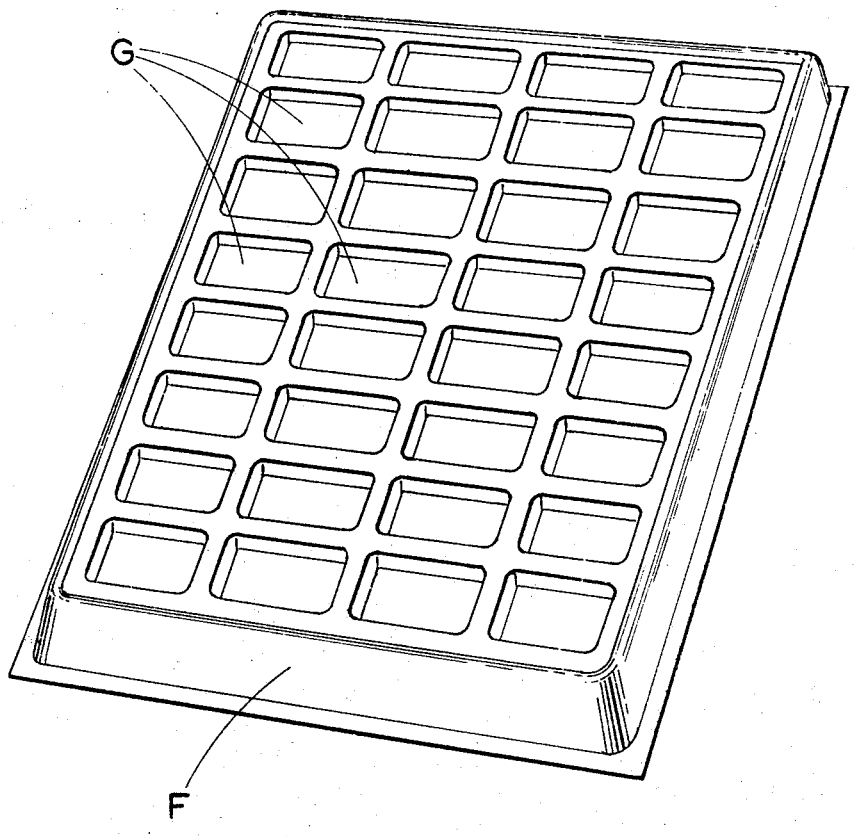

A further specific embodiment of the invention will be described with reference to the accompanying FIG. 3, in which the base member F is a tray made of thin transparent plastic. It has 4 rows of eight wells G, each well being 3 mm. deep and 10 x 15 mm.; the distance between adjacent wells along the longer side is 4 mm. and along the shorter side is 3 mm. The whole tray is of such dimensions that it will just fit into a lid of dimensions 82.5 x 124.5 mm. Conveniently strips of filter paper 10 mm. wide and uniformly impregnated with antibiotic are laid across four wells at a time, so that with filter papers containing various concentrations of antibiotic, four clinical samples could be tested at seven different concentrations of antibiotics, with one control.

I claim:

1. A test pack for testing for the sensitivity of a microorganism to an antibiotic, which test pack comprises a base member having on a planar surface thereof a plurality of wells less than 1 cm. deep each containing a gel medium, and an absorbent material at least part of which is impregnated with an antibiotic and of dimensions such that on being placed in contact with the gel medium in the wells, there is antibiotic impregnated absorbent material in contact with substantially the whole surface area of the gel medium in a plurality of wells.

2. The test pack according to claim 1, wherein the absorbent material is impregnated with one or more antibiotics in discrete areas each corresponding to the area of gel medium in a specific well.

3. The test pack according to claim 1, wherein the absorbent material is in strips each contacting a plurality of wells.

4. The test pack according to claim 1, wherein the gel medium consists of agar containing nutrients.

5. The test pack according to claim 1, wherein the antibiotic is a penicillin.

References Cited

UNITED STATES PATENTS

| 3,107,204 | 10/1963 | Brown et al. | 195—103.5 R |
| 2,787,581 | 4/1957 | Scherr | 195—103.5 R |
| 3,010,880 | 11/1961 | Littman et al. | 195—103.5 R |

FOREIGN PATENTS

| 1,331,874 | 5/1963 | France | 195—103.5 R |

A. LOUIS MONACELL, Primary Examiner

R. J. WARDEN, Assistant Examiner

U.S. Cl. X.R.

195—103.5 R, 139